Feb. 28, 1933.  G. W. HEISE  1,899,615
AIR DEPOLARIZED PRIMARY BATTERY
Filed Aug. 10, 1925   2 Sheets-Sheet 1
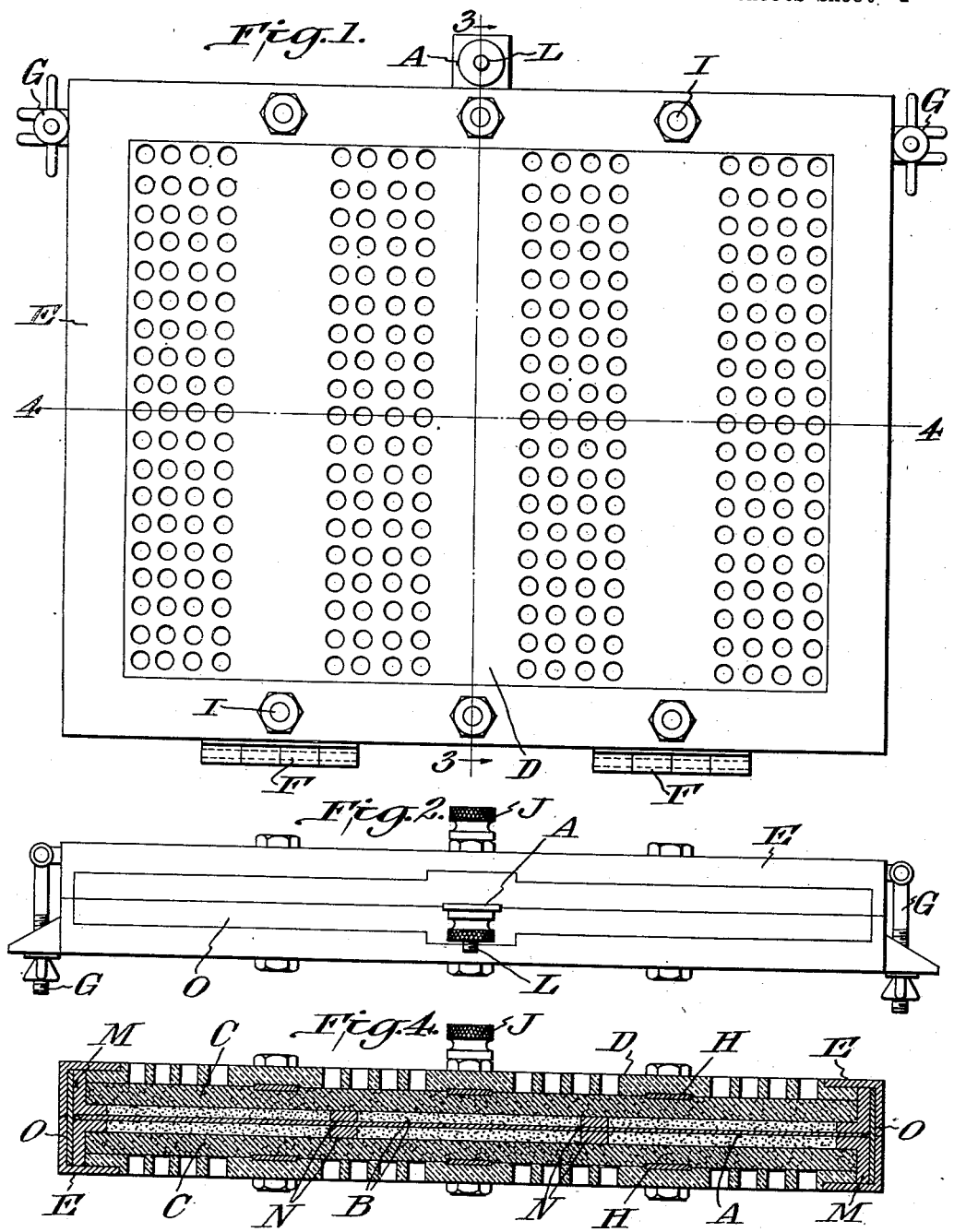

Feb. 28, 1933.　　　　　G. W. HEISE　　　　　1,899,615
AIR DEPOLARIZED PRIMARY BATTERY
Filed Aug. 10, 1925　　2 Sheets-Sheet 2
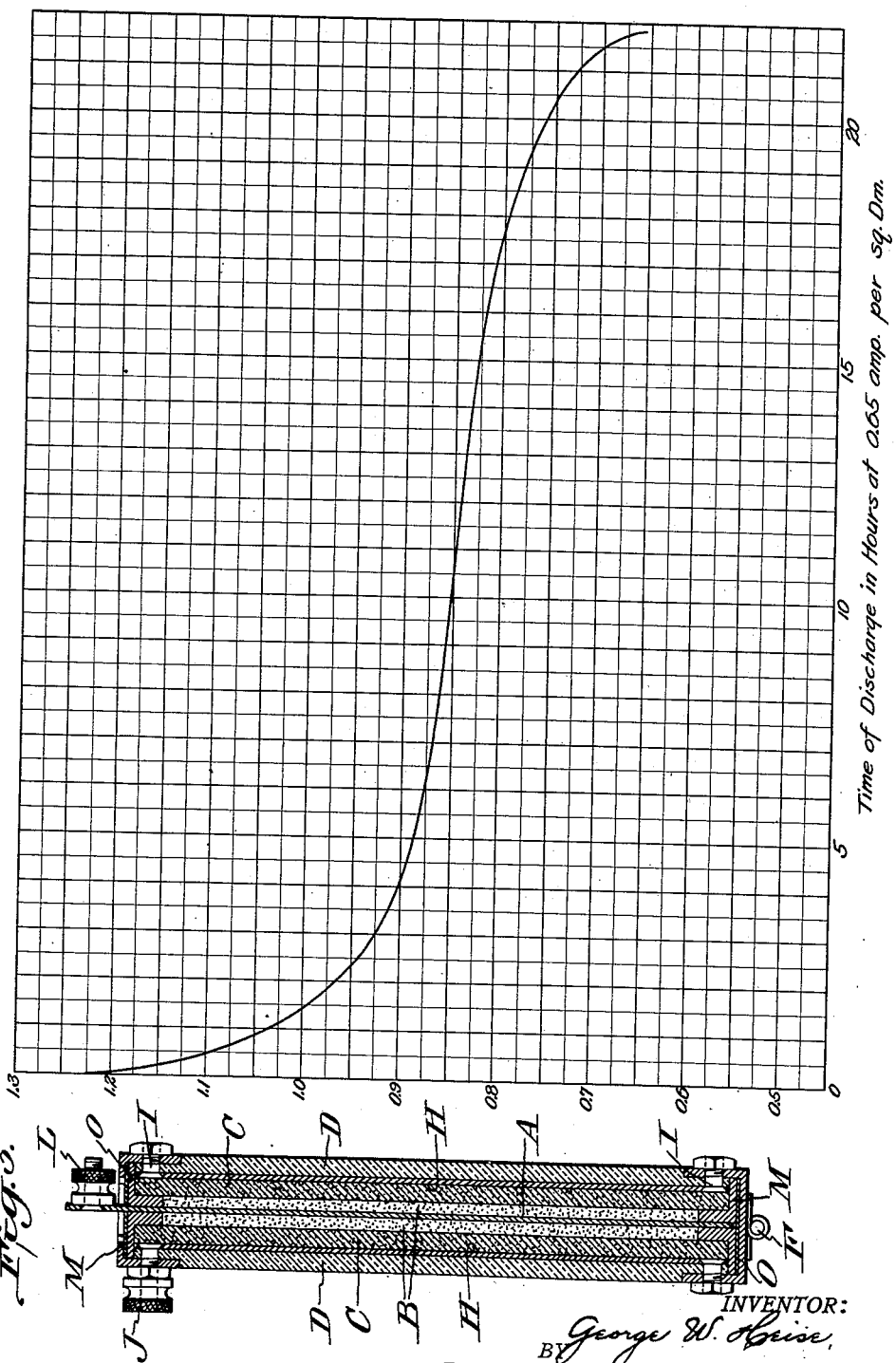
INVENTOR:
George W. Heise,
BY Byrne, Townsend & Brickenstein
ATTORNEYS.

Patented Feb. 28, 1933

1,899,615

UNITED STATES PATENT OFFICE

GEORGE W. HEISE, OF MALVERNE, NEW YORK, ASSIGNOR TO NATIONAL CARBON COMPANY, INC., A CORPORATION OF NEW YORK

AIR-DEPOLARIZED PRIMARY BATTERY

Application filed August 10, 1925. Serial No. 49,404.

This invention relates to primary batteries of the type in which the depolarization of the cathode is accomplished by means of atmospheric oxygen. Such batteries, as heretofore constructed, have been adapted only for intermittent service, or, on continuous discharge for light current drains of the order of say, .03 ampere or less per square decimeter of anode area. In contradistinction to this my improved battery, in its preferred embodiment, is capable of affording sustained heavy service amounting in some cases to 0.65—0.8 amperes and upward per square decimeter of anode area. While my preferred construction is capable of sustaining these heavy drains over periods of many hours, my invention is not limited thereto, since certain features of the invention are applicable also to batteries of the light drain type, and even to batteries employing solid depolarizers such as manganese dioxid. The invention will however be described by reference to a preferred embodiment thereof.

A principal object of my invention is to provide a primary battery of the dry-cell, air-depolarized type, capable of supplying a heavy and relatively constant current for an extended period. A further object of the invention is to provide a cell of this type of compact construction, relatively small volume, and relatively light weight, as compared with other batteries capable of affording a similar current supply. A further object of the invention is to embody these characteristics in a battery of the deferred-action type, which will remain inactive and free from material deterioration until such tme as it is to be used. Other objects of the invention will appear hereinafter.

A preferred embodiment of the invention is shown in the accompanying drawings, in which:

Fig. 1 is a side elevation of a typical construction embodying my invention;

Fig. 2 is a plan view thereof;

Fig. 3 is a transverse section on line 3—3 of Fig. 1; and

Fig. 4 is a transverse section on line 4—4 of Fig. 1.

Fig. 5 is a discharge curve of a particular air-depolarized cell in accordance with my invention.

The cell chosen for illustration is of the "flat" type, comprising electrodes with plane surfaces, although my invention is not limited to this construction since the same elements may be assembled in concentric or other suitable relation. The flat type however presents distinct structural, working and manufacturing advantages and is my preferred form. Whatever the form, the battery comprises four principal elements, the essential characteristics of which are set forth below: these elements are the anode A; the paste or absorptive layer B; the cathode C; and the collecting element D. These several elements are assembled in a suitable frame or holder E, which is of a construction permitting ready replacement of the anode and paste, and preferably of the cathode layer as well. In other words the battery comprises a frame or holder of light but rigid and durable construction, in which the essential battery elements, anode, cathode and paste, are replaceably held. As illustrated, this holder comprises two side frames E which may be of metal, hinged together at F, and provided with a suitable latch or locking device G, by which considerable pressure may be exerted on the battery elements carried by the frames. Each frame carries a side plate D which is pervious to air, and either of conductive material or, if non-conductive, provided with conductive portions adapted to contact with the cathode and to be included in the electric circuit. In the construction chosen for illustration the side-plates D are of perforated hard rubber, wood or the like, provided with internal contact strips H which may be of carbon, or of a non-corrodible metal or alloy, such for example as a cobalt-chromium alloy. These contact strips are secured to the frame, and electrically connected therewith, by screws I, one of which serves as the cathode terminal J.

The cathode C is composed of a layer of finely divided, moistened and compressed but preferably non-baked carbon, applied to and supported by the side plates D and the contact strips H carried thereby. The character of the carbon used exercises a great influence on the performance of the battery, and fine subdivision is in all cases important. Carbon black, which need not be calcined, has been found most satisfactory, although all forms of carbon black are not equally suitable, and the suitability of a given grade can, at the present time, be determined only by trial. A form which gives excellent results is coal-tar-oil black.

The carbon black may be wholly or partly replaced by graphite, for example Acheson graphite No. 697. Mixtures of this graphite with carbon black are superior to the graphite alone.

Another form of carbon which gives good results is activated carbon of the kind known as "Carbonite," prepared by steam-activation, in accordance with the Chaney method, of an agglomerated and baked mixture of anthracite coal and pitch, ground to pass a 140 mesh screen, and mixed with, say, an equal weight of carbon black.

Whatever form of carbon is used, it may usually with advantage be mixed with non-carbonaceous highly absorptive extenders such as kieselguhr. These extenders may be used up to 50% or more by weight of the mixture without decreasing the service characteristics of the battery.

In the operation of the battery, at least a part of the depolarization is brought about by the oxidation of hydrogen, in the pores of the carbon cathode, by atmospheric oxygen. In the case of cells intended for heavy drain service, it is desirable or necessary to accelerate this oxidation by the use of suitable activating substances or accelerators admixed with the carbon in small proportions. Among such accelerators cuprous oxid has been found most satisfactory, although I may use the oxids, sulfids, or so-called oxysulfids of heavy metals having multiple valences, as for example cupric oxid, sulfids and oxysulfides of copper, oxids of nickel and cobalt, and the like. Organic accelerators may also be used, particularly bodies of the photographic developer type, as pyrogallol. The accelerator is used in small proportions, usually not exceeding 1 to 5% by weight of the carbon, and uniformly distributed throughout the mass. My preferred mixture at the present time is carbon black of the grade specified above admixed with about 1% of cuprous oxid, the mixture moistened with ammonium chlorid solution, and compressed into self-supporting cakes or tablets. When fine graphite is substituted for the carbon black the proportion of cuprous oxid is advantageously increased to about 5%.

It is to be clearly understood that accelerators of this copper oxid type cannot be used practically in primary batteries of the usual Le Clanché type (zinc-manganese dioxide-ammonium chloride) since they dissolve in the electrolyte, especially after some ammonia has been set free during the first moments of service, and initiate corrosion of the zinc, thereby destroying the otherwise excellent shelf-like characteristics of this type of battery. I use these accelerators in a deferred-action type of battery, preferably of a form in which the anode or zinc element is inserted in its operative position only when the battery is to be put in active service, and when the intended service is of the heavy-drain, short-duration type, so that considerations of shelf deterioration are not controlling. I use these oxids in relatively small proportions, whereby their corrosive effect on the anode is lessened. Such use is to be clearly differentiated from the known employment of reducible oxids in relatively large proportions to serve as primary depolarizers in batteries having a non-replaceable anode, (or which are not otherwise of the deferred-action type,) irrespective of whether or not provision is made for allowing access of atmospheric oxygen to the depolarizer for the purpose of regenerating it.

It is of course to be understood that the desired deferred-action effect, or avoidance of corrosion, may be accomplished in other ways than by holding the zinc element in reserve: as for instance by holding the paste in reserve; by using an anhydrous assembly to which water or electrolyte may be added; by inserting a separator of paper or other cellulosic material between the anode and cathode, and preferably between the paste and the cathode, to fix soluble copper; or otherwise. I prefer however to hold the zinc in reserve as the most convenient and satisfactory method of avoiding premature corrosion, and the zinc anode being shipped with the cell and inserted when it is to be put into service. The cells are preferably shipped and stored under hermetic seal to avoid evaporation of moisture or chemical change.

Referring again to the drawings, the anode consists of a plane sheet of metal A, usually zinc, adapted to be inserted into the frame between insulating guides M, M which prevent it from contacting with the cathodes C. Supplementary insulating guide strips N, N may preferably extend across the frame at one or more intermediate points, the assembly being such that the sheet anode may be readily inserted and removed. O represents strips of pulpboard, cloth or the like flexible material, serving to prevent leakage at the junction line of the frame parts.

B indicates the paste layer, used either as such or in conjunction with an absorbent material such as pulpboard or the like.

In battery construction it is the usual practice to employ a cereal paste made up with a solution of zinc and ammonium chlorides. In cells designed for heavy-drain service, and particularly for such cells of the air-depolarized type, I depart from this practice in that I add solid sal ammoniac to the paste as an essential constituent thereof, having found that thereby I can very greatly improve the service characteristics of the cell, especially by increasing the service time under heavy drains. A preferred method of preparing the paste is as follows:

The cereal paste is prepared and cooked as usual, using an ammonium chlorid solution which is about 90% saturated. I then mix with this paste solid ammonium chloride in an amount equal to 25–75% by weight, about 50% being a suitable proportion: only a small proportion of the solid salt passes initially into solution in the nearly saturated solution used for preparation of the paste. The rest remains in the paste in solid phase.

It should be understood that in batteries of the Le Clanché type, it is common practice to distribute the sal ammoniac between the paste and the mix (manganese dioxid and carbon) the whole of the undissolved sal ammoniac, when this is present, being added to the mix. In contradistinction to this practice, I incorporate a part or preferably all of the undissolved sal ammoniac in the paste. I have found that under specific conditions a given weight of sal ammoniac introduced into the paste had nearly twice the service effect of a like amount distributed between paste and mix in accordance with the usual practice.

This employment of solid electrolyte as a component of the paste is applicable generally in galvanic battery cells of the kind comprising a metal anode, a cathode containing conductive carbonaceous material and an electrolyte containing an ammonium halide, such as the chloride, and is more fully described and broadly claimed in my copending application Serial No. 403,131, filed October 28, 1929.

I desire also to point out that a definite relation exists between the use of a paste containing solid electrolyte, hereinafter for convenience termed a "salted paste", and the use of an accelerator in conjunction with the carbon cathode of an air-depolarized cell. With salted paste and accelerator-free or uncatalyzed carbon the cell dies under continuous heavy service before the sal ammoniac is completely used up, the voltage falling due to polarization. With unsalted paste on the contrary, an uncatalyzed carbon, if of active type such as carbon black, may be sufficiently active to keep pace with the operation of the cell; and in this particular case the employment of an accelerator with the carbon adds but little to the service. On the other hand, when a salted paste is used it is practically necessary, for the best results, to catalyze the oxidation of the hydrogen, as by the use of such reaction-accelerators as are described above. It will be understood that the primary effect of these catalyzers is to raise the operating voltage of the cell, and thereby to increase the service to the voltage cut-off point.

The construction of the battery may be variously modified without departure from my invention. For instance, excellent results have been obtained by the use of side-plates D composed of thin sheets of baked carbon or graphite, which have a porosity of the order of 20% and upward and are sufficiently permeable to air for the purposes of the invention, as well as sufficiently conductive to serve as collector electrodes, and sufficiently strong and rigid to permit the elements of the battery to be held under the desired compression.

For special purposes where high voltage is required, magnesium or alloys thereof with aluminum may be substituted for the zinc, although such batteries show a decidedly higher excess corrosion above that corresponding to the current delivered. This excess corrosion may however be lessened in various ways, as by substituting ammonium bromide for the chloride as the electrolyte, or better by the addition of small proportions of soluble bichromates to the paste, or alternatively by pre-treating the magnesium anode with a chromic acid solution. For ordinary uses however zinc is my preferred anode material. When magnesium or its alloys are used as the anode, the use of a copper catalyst is undesirable.

Batteries constructed as herein described for heavy drain service are capable of a much greater current output per unit of weight, as compared with dry batteries of the standard type, or as compared with storage batteries. This fits them for certain special service conditions where a heavy drain for a relatively short period, coupled with minimum weight is desired, a typical instance of this being in connection with miner's lamps, where the batteries are carried either on the cap or back of the miner according to weight, and where a sustained light of about one candle power is required over an eight-hour period for each working day. With the lamps now available for this type of service this requires a current of the order of one ampere at about 1.5–2.4 volts. I have constructed air-depolarized cells of the kind described above capable of delivering one ampere for more than 20 hours to a cut-off voltage of 0.75, so that two cells in series are adequate for the above service over a two-day period without replenishing parts. The weight of these cells, including the permanent frame or housing, was about 300 grams each. The weight of standard six-inch dry cells capable of the same service would be upward of six times as great.

Fig. 5 is a discharge curve of a particular air-depolarized cell at the rate of .65 ampere per square decimeter. In this case the cell comprised a zinc anode, a carbon-black cathode admixed with 1% of cuprous oxid, and a paste layer containing solid ammonium chloride. In this instance it will be noted that the service life to 0.75 volts cut-off was upward of 20 hours. The discharge characteristic of the battery will of course vary according to its composition, construction and intended use, so that my invention is not limited to batteries of the particular service characteristics indicated by this curve.

While finely divided carbon is the most satisfactory material now known to me for use as cathode, my invention is not restricted thereto inasmuch as the essential requirements for a cathode material, such as electrical conductivity, resistance to attack by the electrolyte or its decomposition products, and the power to occlude oxygen, are to be found in many finely divided metals and alloys, including platinum and platinized asbestos, etc. I have accordingly used the expression "oxygen-occluding material" as a generic designation of such substances as are capable of functioning as the cathode in the described relation.

In the appended claims, the term "air-depolarized cell" is used to designate a cell in which depolarization is effected by atmospheric oxygen, and in which, if a metal oxide reducible by the operation of the cell is present in contact with the cathode, the quantity of such oxide is insufficient to oxidize a substantial proportion of hydrogen liberated at the cathode during the normal service life of the cell. The term "depolarizing catalyst" is used to designate a substance which promotes the combining of atmospheric oxygen with hydrogen liberated at the cathode by the action of the cell, but which does not itself contribute any substantial proportion of the oxygen required to combine with such hydrogen.

I claim:

1. An air-depolarized cell comprising an anode, a cathode exposed to the atmosphere and containing finely subdivided oxygen-occluding material, a catalyst and an extender, a current-collecting device contacting with said cathode, and a paste layer between anode and cathode, said elements assembled under compression.

2. An air-depolarized cell comprising an anode, a cathode containing finely subdivided carbon exposed to the atmosphere and having distributed therethrough a small proportion of a depolarizing catalyst, a current-collecting device contacting with said cathode, and a paste layer between anode and cathode, said elements assembled under compression.

3. In an air-depolarized primary battery, an anode, a cathode exposed to the atmosphere and containing finely subdivided oxygen-occluding material and a catalyst, and an intermediate paste layer.

4. In an air-depolarized primary battery, an anode, a cathode containing finely subdivided carbon and exposed to the atmosphere, said cathode having distributed therethrough a small proportion of a depolarizing catalyst, and an intermediate paste layer.

5. In an air-depolarized primary battery, an anode, an oxygen-occluding cathode exposed to the atmosphere and comprising finely subdivided carbon and a non-carbonaceous absorptive material, a paste layer intermediate said electrodes, and a current-collecting device contacting with said cathode.

6. In an air-depolarized primary battery, an anode, a cathode comprising finely subdivided carbon, a non-carbonaceous absorptive material and a depolarizing catalyst, a paste layer intermediate said electrodes, and a current-collecting device contacting with said cathode.

7. In an air-depolarized primary battery of the deferred action type, the combination with a replaceable anode, of a cathode comprising finely divided carbonaceous material and a depolarizing catalyst and exposed to the atmosphere, and a paste layer intermediate said electrodes, said elements assembled under compression.

8. In an air-depolarized primary battery, an anode, a cathode comprising carbon black and a depolarizing catalyst, an intermediate paste layer, and a current-collecting device contacting with said cathode, said elements assembled under compression.

9. In an air-depolarized primary battery, an anode, a cathode comprising carbon black and a depolarizing catalyst including a copper compound, an intermediate paste layer, and a current-collecting device contacting with said cathode, said elements assembled under compression.

10. An air-depolarized primary cell having an anode; a carbonaceous cathode comprising a catalyst in the proportion of about 1% by weight; and an electrolyte paste between said electrodes.

11. An air-depolarized primary cell having an anode; a carbonaceous cathode comprising cuprous oxide in the proportion of about 1% by weight; and a paste electrolyte between said electrodes.

12. An air depolarized primary cell having an anode; a carbonaceous cathode comprising cuprous oxide in the proportion of about 1% by weight; and a paste electrolyte between said electrodes comprising ammonium chloride.

In testimony whereof, I affix my signature.

GEORGE W. HEISE.